United States Patent
Rosen et al.

(10) Patent No.: US 8,920,032 B2
(45) Date of Patent: *Dec. 30, 2014

(54) BEARING SLEEVE

(71) Applicant: Hamilton Sundstrand Corporation, Windsor Locks, CT (US)

(72) Inventors: Seth E. Rosen, Middletown, CT (US); Ronald M. Struziak, Longmeadow, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,627

(22) Filed: Apr. 30, 2013

(65) Prior Publication Data

US 2014/0270603 A1    Sep. 18, 2014

Related U.S. Application Data

(60) Provisional application No. 61/788,125, filed on Mar. 15, 2013.

(51) Int. Cl.
*F16C 32/06* (2006.01)
*F16C 17/02* (2006.01)
*F16C 33/74* (2006.01)

(52) U.S. Cl.
CPC ............... *F16C 17/024* (2013.01); *F16C 33/74* (2013.01)
USPC ........................................................ 384/103

(58) Field of Classification Search
CPC ................................. F16C 17/024; F16C 33/74
USPC ........ 384/103–106, 114, 119, 215; 415/179.1
See application file for complete search history.

(56) References Cited

U.S. PATENT DOCUMENTS

| 5,014,518 | A | 5/1991 | Thomson et al. |
| 5,113,670 | A | 5/1992 | McAuliffe et al. |
| 5,309,735 | A | 5/1994 | Maher, Jr. et al. |
| 5,634,723 | A * | 6/1997 | Agrawal ........................ 384/106 |
| 6,786,642 | B2 * | 9/2004 | Dubreuil et al. .............. 384/106 |
| 6,811,315 | B2 * | 11/2004 | Fournier et al. ............... 384/105 |
| 7,108,488 | B2 * | 9/2006 | Larue et al. .................... 417/407 |

(Continued)

FOREIGN PATENT DOCUMENTS

| CN | 101108400 B | 7/2010 |
| CN | 202645571 U | 1/2013 |

(Continued)

*Primary Examiner* — Marcus Charles
(74) *Attorney, Agent, or Firm* — Carlson, Gaskey & Olds P.C.

(57) ABSTRACT

Disclosed is a bearing sleeve for supporting a shaft of an air cycle machine. The bearing sleeve includes an outer diameter and an inner diameter. The outer diameter is within a range of 3.214 and 3.216 inches. Further included is a foil retaining cavity provided in the inner diameter of the sleeve. The foil retaining cavity includes a slot and first and second openings located at opposing axial ends of the slot. Each of the first and second openings include a small portion and a large portion having different axial lengths. A ratio of the combined axial lengths of the large portions to an axial length of the foil retaining cavity is within a range of 0.19:1 and 0.22:1. Further included is a seal attachment portion provided at one axial end of the bearing sleeve configured to circumferentially support a seal.

20 Claims, 4 Drawing Sheets

(56) References Cited

U.S. PATENT DOCUMENTS

| | | | |
|---|---|---|---|
| 7,267,523 B2* | 9/2007 | Saville | 415/1 |
| 7,367,122 B2 | 5/2008 | Yip et al. | |
| 7,553,086 B2* | 6/2009 | Kang et al. | 384/103 |
| 7,648,279 B2 | 1/2010 | Struziak et al. | |
| 7,648,280 B2* | 1/2010 | Struziak et al. | 384/106 |
| 7,658,545 B2* | 2/2010 | Dubreuil et al. | 384/106 |
| 8,029,194 B2* | 10/2011 | Agrawal et al. | 384/106 |
| 8,100,586 B2* | 1/2012 | Ruggiero et al. | 384/103 |
| 8,353,631 B2* | 1/2013 | Kim | 384/103 |
| 8,360,645 B2* | 1/2013 | Omori | 384/106 |
| 8,371,799 B2* | 2/2013 | Spathias et al. | 415/1 |
| 8,419,283 B2* | 4/2013 | McAuliffe et al. | 384/103 |
| 2004/0120617 A1* | 6/2004 | Fournier et al. | 384/105 |
| 2005/0163407 A1* | 7/2005 | Kang et al. | 384/106 |
| 2005/0210875 A1* | 9/2005 | Larue et al. | 60/602 |
| 2008/0292229 A1 | 11/2008 | Dubreuil et al. | |
| 2012/0027327 A1 | 2/2012 | McAuliffe et al. | |
| 2012/0251300 A1* | 10/2012 | Struziak | 415/170.1 |
| 2013/0011211 A1* | 1/2013 | Heshmat et al. | 408/56 |

FOREIGN PATENT DOCUMENTS

| | | | | |
|---|---|---|---|---|
| JP | 06123310 A | * | 5/1994 | F16C 25/04 |
| JP | 2008261496 A | | 10/2008 | |
| JP | 2012031995 | | 2/2012 | |

* cited by examiner

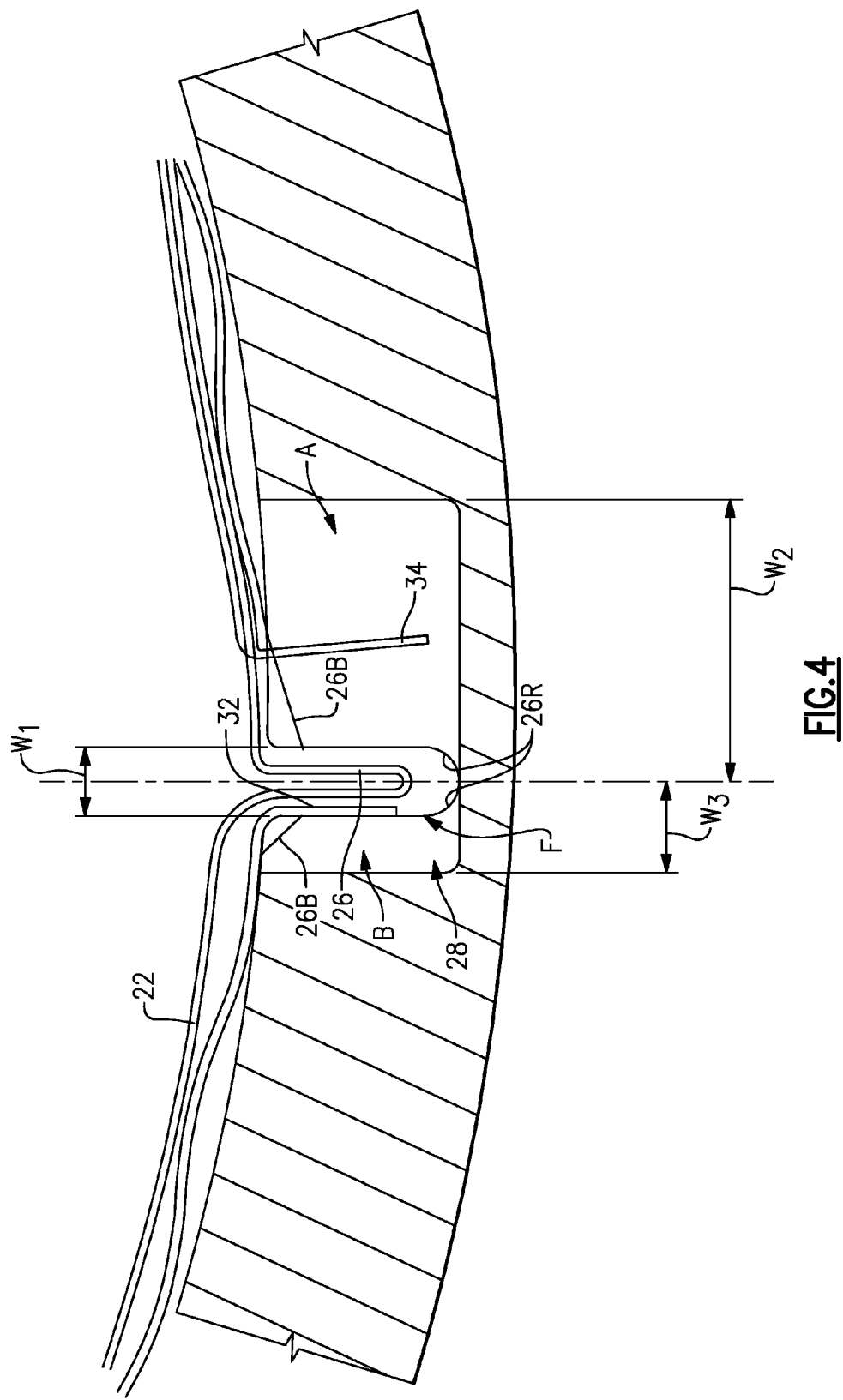

BEARING SLEEVE

RELATED APPLICATIONS

This application claims the benefit of U.S. Provisional Application No. 61/788,125, filed Mar. 15, 2013, the entirety of which is herein incorporated by reference.

BACKGROUND

This application relates to bearing sleeves, and in particular to bearing sleeves for air cycle machines (ACMs).

ACMs are known and include a compressor which compresses air and delivers the air for a downstream use, such as is an aircraft air supply system. A portion of the air from the compressor outlet passes over a turbine rotor, driving the turbine rotor to rotate. An ACM may include several rotating shafts supported by air bearings. One known type of air bearing includes a foil assembly supported by a bearing sleeve.

SUMMARY

In one exemplary embodiment of this disclosure includes a bearing sleeve configured for supporting a shaft of an air cycle machine. The bearing sleeve includes an outer diameter and an inner diameter. The outer diameter is within a range of 3.214 and 3.216 inches. Further included is a foil retaining cavity provided in the inner diameter of the sleeve. The foil retaining cavity includes a slot and first and second openings located at opposing axial ends of the slot. Each of the first and second openings include a small portion and a large portion having different axial lengths. A ratio of the combined axial lengths of the large portions to an axial length of the foil retaining cavity is within a range of 0.19:1 and 0.22:1. Further included is a seal attachment portion provided at one axial end of the bearing sleeve configured to circumferentially support a seal.

In a further embodiment of any of the above, a portion of the outer diameter is arcuate relative to an outside radius having an origin radially outside of the outer diameter of the bearing sleeve.

In a further embodiment of any of the above, the outside radius has an origin approximately 4 inches away from the outside diameter, as measured a distance within a range of a range of 0.190 and 0.210 inches from an axial end of the bearing sleeve.

In a further embodiment of any of the above, a ratio of the outer diameter to the inner diameter is within a range of 1.140:1 and 1.142:1.

In a further embodiment of any of the above, the large portions of the first and second openings each have axial lengths within a range of 0.265 and 0.305 inches.

In a further embodiment of any of the above, the small portions of the first and second openings each have axial lengths within a range of 0.12 and 0.16 inches.

In a further embodiment of any of the above, the large portions of the first and second openings each have widths within a range of 0.215 and 0.225 inches, measured relative to a centerline of the slot.

In a further embodiment of any of the above, the small portions of the first and second openings each have widths within a range of 0.065 and 0.075 inches, measured relative to a centerline of the slot.

In a further embodiment of any of the above, the foil retaining cavity has a length within a range of 2.795 and 2.805 inches.

Another exemplary embodiment of this disclosure includes an air cycle machine having a bearing sleeve. The bearing sleeve includes an outer diameter and an inner diameter. The outer diameter is within a range of 3.214 and 3.216 inches. Further included is a foil retaining cavity provided in the inner diameter of the sleeve. The foil retaining cavity includes a slot and first and second openings located at opposing axial ends of the slot. Each of the first and second openings include a small portion and a large portion having different axial lengths. A ratio of the combined axial lengths of the large portions to an axial length of the foil retaining cavity is within a range of 0.19:1 and 0.22:1. Further included is a seal attachment portion provided at one axial end of the bearing sleeve configured to circumferentially support a seal.

In a further embodiment of any of the above, the air cycle machine includes a foil assembly, the foil assembly including a bent portion and tabs at axial ends thereof.

In a further embodiment of any of the above, the bent portion is received within the slot, and wherein the tabs are received within the large portions of the first and second openings.

In a further embodiment of any of the above, the air cycle machine includes at least one O-ring supporting the bearing sleeve within a central opening in the air cycle machine, the O-ring directly engaged with the outer diameter of the bearing sleeve.

In a further embodiment of any of the above, the air cycle machine includes a seal supported by the seal attachment portion.

In a further embodiment of any of the above, a portion of the outer diameter is arcuate relative to an outside radius having an origin radially outside of the outer diameter of the bearing sleeve.

In a further embodiment of any of the above, the outside radius has an origin approximately 4 inches away from the outside diameter, as measured a distance within a range of a range of 0.190 and 0.210 inches from an axial end of the bearing sleeve.

In a further embodiment of any of the above, a ratio of the outer diameter to the inner diameter is within a range of 1.140:1 and 1.142:1.

In a further embodiment of any of the above, the large portions of the first and second openings each have axial lengths within a range of 0.265 and 0.305 inches.

In a further embodiment of any of the above, the small portions of the first and second openings each have axial lengths within a range of 0.12 and 0.16 inches.

In a further embodiment of any of the above, the foil retaining cavity has a length within a range of 2.795 and 2.805 inches.

BRIEF DESCRIPTION OF THE DRAWINGS

The drawings can be briefly described as follows:

FIG. 4 is a view taken along line 4-4 from FIG. 3.

DETAILED DESCRIPTION

Figure 1:
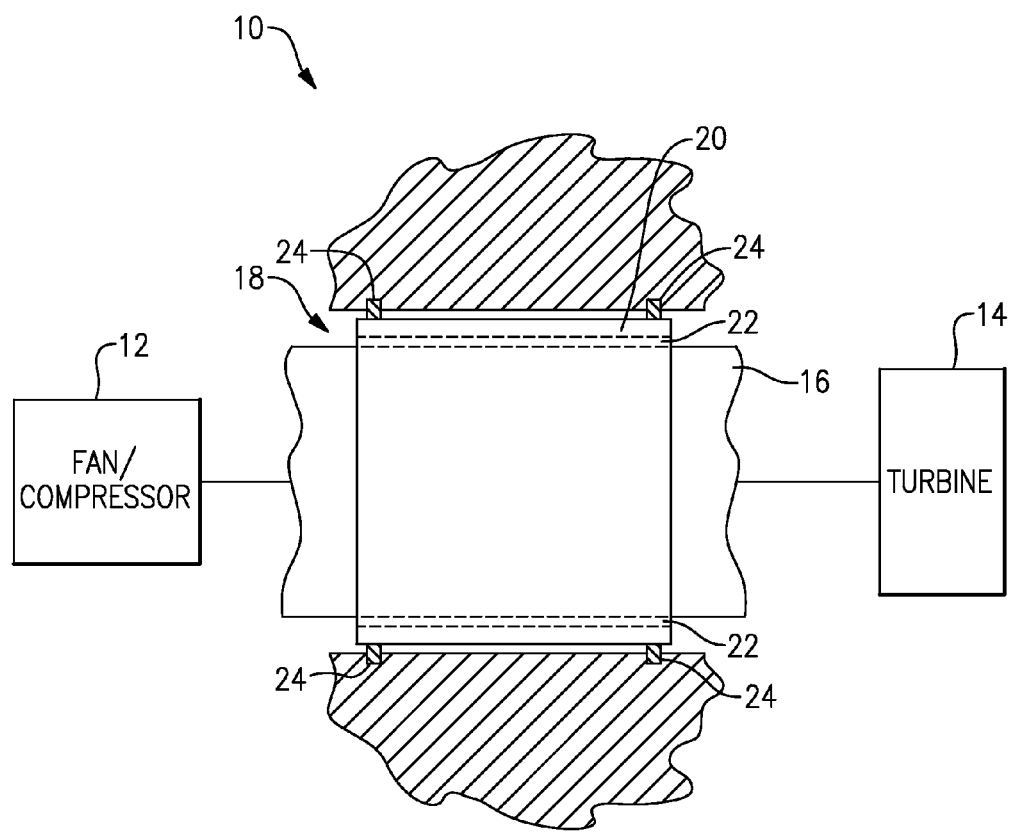
FIG. 1 schematically illustrates an example air cycle machine (ACM).

FIG. 1 schematically illustrates an air cycle machine (ACM) 10 including a fan, or compressor, section 12, a turbine section 14, and at least one shaft 16. The shaft 16 is supported by a bearing assembly 18, which includes a bearing sleeve 20, a foil assembly 22, and O-rings 24. The foil assembly 22 is positioned circumferentially within the bearing sleeve 20. The foil assembly 22 is configured to interact with the shaft 16 and allow the shaft 16 to rotate, as is known in the art. The bearing sleeve 20 is supported within a central opening in the ACM 10 by way of the O-rings 24.

Figure 2:
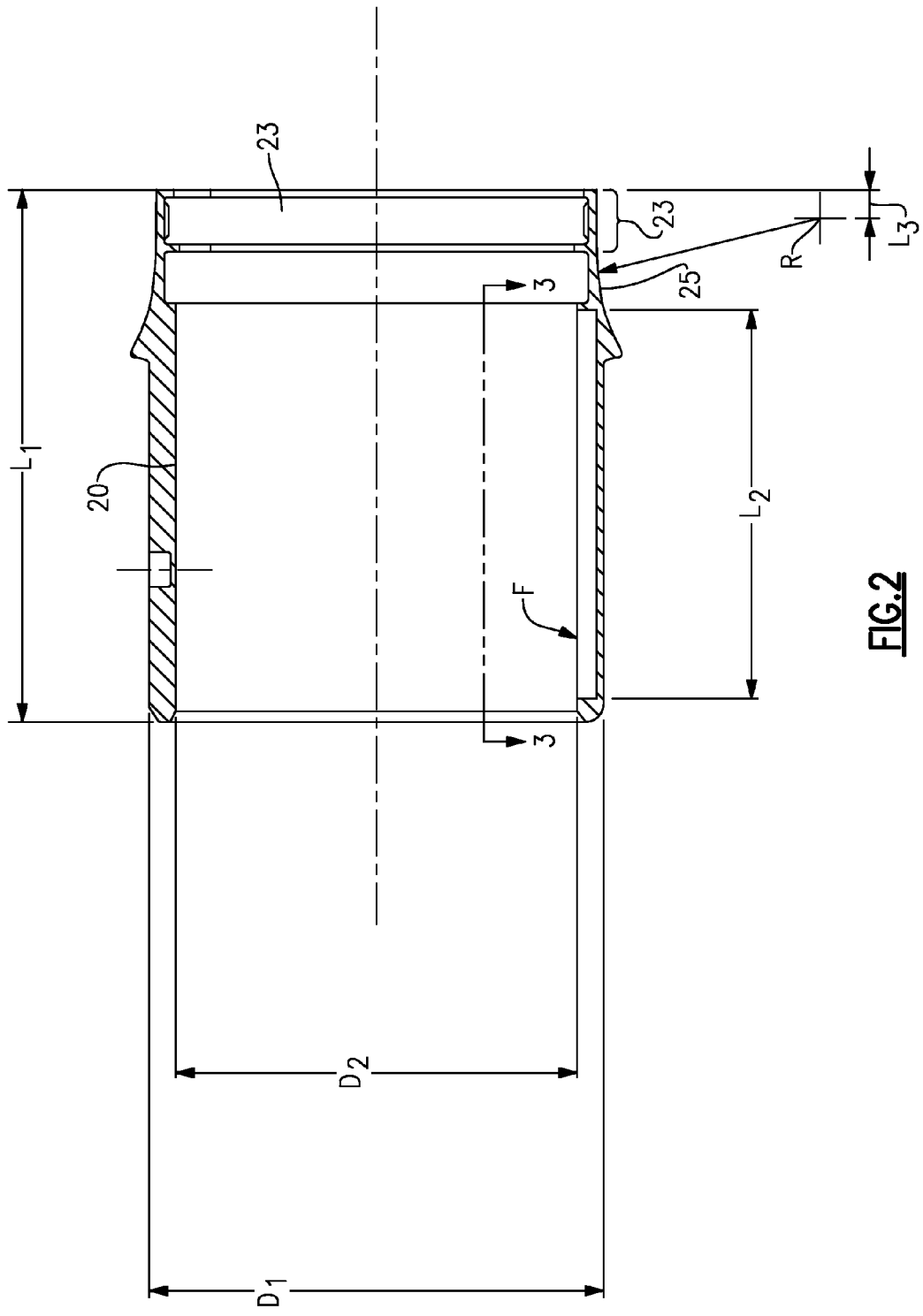
FIG. 2 illustrates a cross-sectional view of an example bearing sleeve.

FIG. 2 illustrates a cross-sectional view of an example bearing sleeve 20. The bearing sleeve 20 includes an outer diameter D1, an inner diameter D2, and spans an axial length L1. The foil assembly 22 is supported by the bearing sleeve 20 by way of a foil retaining cavity F provided in the inner diameter of the bearing sleeve 20. In the example, the axial length L1 of the bearing sleeve 20 is within a range of 3.835 and 3.845 inches (approximately 9.741 to 9.776 cm). Further, the foil retaining cavity has an overall length L2 within a range of 2.795 and 2.805 inches (approximately 7.099 to 7.125 cm).

The outer diameter D1 of the bearing sleeve 20 is selected to provide a desired preload relative to the O-rings 24. This preload is selected such that the bearing sleeve 20 will remain in place during operation, as well as to provide a desired damping level for the ACM 10. For example, the higher the preload, the higher the damping during operation of the ACM 10.

In one example, the outer diameter D1 is within a range of 3.214 and 3.216 inches (approximately 8.164 to 8.169 cm). This D1 provides the ACM with a relatively low, yet adequate, level of damping while ensuring that the bearing sleeve 20 remains in place during operation. In this example, the ratio of the outer diameter D1 to the inner diameter D2 is within a range of 1.140:1 and 1.142:1.

With continued reference to FIG. 2, the example bearing sleeve 20 includes a seal attachment portion 23 configured to circumferentially support a seal. In one example, the seal is a knife edge seal. The seal can be made of a plastic material, and in one example includes a material known as Vespel™ (a trademark of DuPont). The seal is configured to limit air flow between the foil assembly 22 and various other sections of the ACM 10. A portion of the bearing sleeve 20 is arcuate relative to an outside radius 25 configured to interact with an airflow flowing within the ACM 10. In one example, the bearing sleeve 20 is adjacent the turbine section 14 and the outside radius 25 provides an airflow boundary. In this example, the outside radius 25 has an origin a distance R from the edge of the bearing sleeve 20, measured a distance L3 from an axial end of the bearing sleeve 20. In one example, the distance R is approximately 4 inches (approximately 10.16 cm), within a tolerance, and the distance L3 is within a range of 0.190 and 0.210 inches (approximately 0.483 to 0.533 cm).

Figure 3:
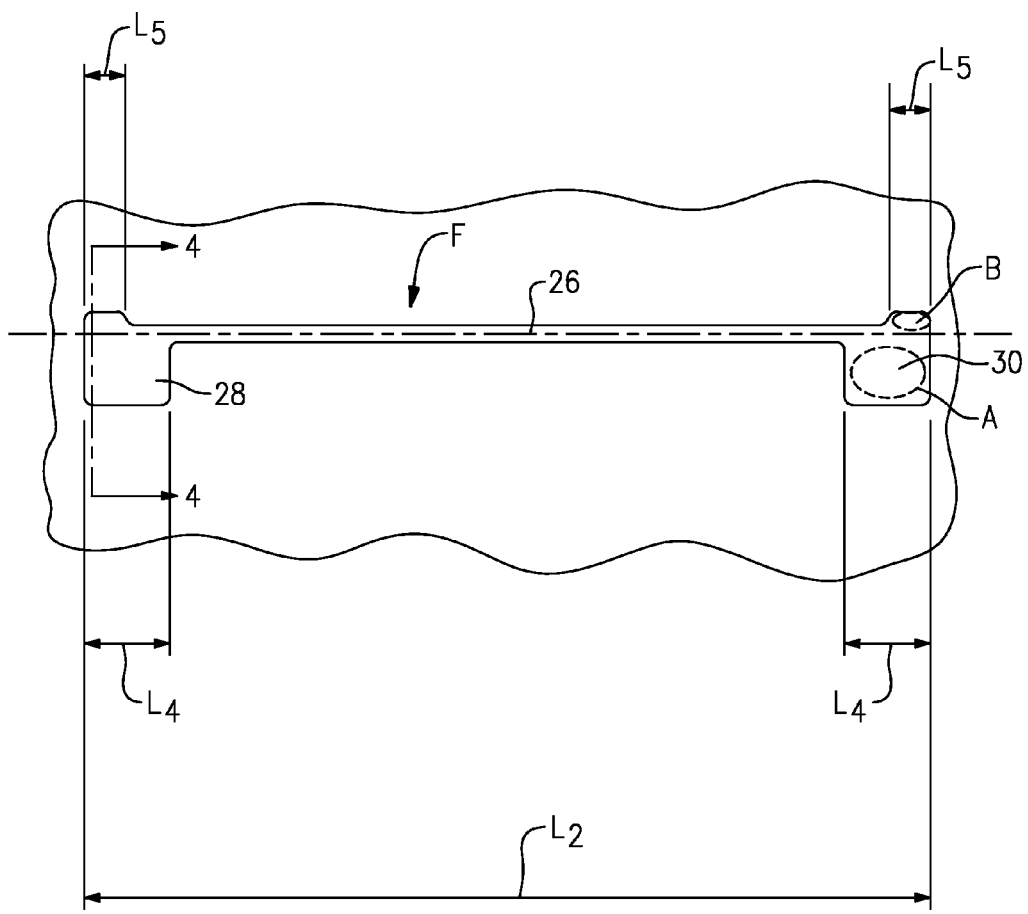
FIG. 3 is a view taken along line 3-3 from FIG. 2.

As illustrated in FIG. 3, which is a view taken along line 3-3 in FIG. 2, the foil retaining cavity includes a slot 26 and first and second openings 28, 30 at opposed axial ends of the slot 26. In one example the openings 28, 30 each include large portion A, as well as a relatively smaller portion B. The large portions A have an axial length L4, and the smaller portions B have a smaller axial length L5.

In this example each large portion A has an axial length L4 of within a range of 0.265 and 0.305 inches (approximately 0.673 to 0.775 cm), which is selected to correspond to a length of the tabs 34 of a foil assembly 22 (FIG. 4). The length of the smaller portions L5 is within a range of 0.12 and 0.16 inches (approximately 0.305 to 0.406 cm).

In this example, a ratio of the combined axial length of the large portions L4 (2×L4) to an overall axial length of the foil retaining cavity L2 is within a range of 0.19:1 and 0.22:1. This ratio relates the length of the foil retaining cavity F used to interact with the tabs of the foil assembly 22 (e.g., 2×L4) versus the overall length of the foil retaining cavity L2. While this is just one example, many of the dimensions disclosed herein are interrelated and thus can be usefully expressed in terms of ratios.

FIG. 4 is a view taken along line 4-4 from FIG. 3, and illustrates the manner in which the foil assembly 22 is retained by the foil cavity F. The foil assembly 22 includes a bent portion 32 along its length for receipt into the slot 26. The slot 26 has a width W1 to receive the bent portion. In one example the width W1 is within a range of 0.041 and 0.047 inches (approximately 0.104 to 0.120 cm). The slot 26 further includes radii 26R at the base thereof, and break edges 26B where the slot 26 is provided into the inner diameter of the bearing sleeve 20 for ease of machining.

The foil assembly 22 further includes tabs 34 at each axial end thereof. The tabs 34 are configured to be received within the large portions A of the first and second openings 28, 30 of the foil retaining cavity. The tabs 34 have an axial length corresponding to the axial length L4 of the large portions A.

FIG. 4 further illustrates the widths of the large and small portions A, B of the openings 28, 30. In this example, large portion A has a width W2 within a range of 0.215 and 0.225 inches (approximately 0.546 to 0.575 cm), and small portion B has a width W3 within a range of 0.065 and 0.075 inches (approximately 0.165 to 0.191 cm), with W2 and W3 each measured relative to the centerline of the slot 26.

In one example, the bearing sleeve 20 is made of steel by way of an electron discharge machining (EDM) process. The foil retaining cavity F is formed during the EDM process in the example. After forming the foil retaining cavity F using the EDM process, the inner diameter D2 is further machined to provide a desired preload on the foil assembly 22. That is, the dimension of the inner diameter D2 is selected such that the foil assembly 22 engages the shaft 16 with an appropriate amount of force such that the foil assembly 22 will remain in place during operation, while still permitting the shaft 16 to freely rotate. Machining the inner diameter after the EDM process has the benefits of removing any residue (e.g., burrs) left behind after the EDM process, and preventing any warping of the bearing sleeve 20.

This disclosure provides bearing sleeves that interact with a foil assembly, as well as O-rings, to provide appropriate preloads, which relate to the damping of the ACM and the support of the foil assembly, among other benefits.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A bearing sleeve for supporting a shaft of an air cycle machine, comprising:
    an outer diameter and an inner diameter, wherein the outer diameter is within a range of 3.214 and 3.216 inches;
    a foil retaining cavity provided in the inner diameter, the foil retaining cavity including a slot and first and second openings located at opposing axial ends of the slot, each of the first and second openings including a small portion and a large portion having different axial lengths, wherein a ratio of the combined axial lengths of the large portions to an overall axial length of the foil retaining cavity is within a range of 0.19:1 and 0.22:1; and a seal attachment portion provided at one axial end of the bearing sleeve configured to circumferentially support a seal.

2. The bearing sleeve as recited in claim 1, wherein a portion of the outer diameter is arcuate relative to an outside radius having an origin radially outside of the outer diameter of the bearing sleeve.

3. The bearing sleeve as recited in claim 2, wherein the outside radius has an origin approximately 4 inches away from the outside diameter, as measured a distance within a range of a range of 0.190 and 0.210 inches from an axial end of the bearing sleeve.

4. The bearing sleeve as recited in claim 1, wherein a ratio of the outer diameter to the inner diameter is within a range of 1.140:1 and 1.142:1.

5. The bearing sleeve as recited in claim 1, wherein the large portions of the first and second openings each have axial lengths within a range of 0.265 and 0.305 inches.

6. The bearing sleeve as recited in claim 1, wherein the small portions of the first and second openings each have axial lengths within a range of 0.12 and 0.16 inches.

7. The bearing sleeve as recited in claim 1, wherein the large portions of the first and second openings each have widths within a range of 0.215 and 0.225 inches, measured relative to a centerline of the slot.

8. The bearing sleeve as recited in claim 1, wherein the small portions of the first and second openings each have widths within a range of 0.065 and 0.075 inches, measured relative to a centerline of the slot.

9. The bearing sleeve as recited in claim 1, wherein the foil retaining cavity has a length within a range of 2.795 and 2.805 inches.

10. An air cycle machine, comprising:

a bearing sleeve, the bearing sleeve including an outer diameter and an inner diameter, wherein the outer diameter is within a range of 3.214 and 3.216 inches, the bearing sleeve further including a foil retaining cavity provided in the inner diameter, the foil retaining cavity including a slot and first and second openings located at opposing axial ends of the slot, each of the first and second openings including a small portion and a large portion having different axial lengths, wherein a ratio of the combined axial lengths of the large portions to an overall axial length of the foil retaining cavity is within a range of 0.19:1 and 0.22:1, and the bearing sleeve further including a seal attachment portion provided at one axial end of the bearing sleeve configured to circumferentially support a seal.

11. The air cycle machine as recited in claim 10, including a foil assembly, the foil assembly including a bent portion and tabs at axial ends thereof.

12. The air cycle machine as recited in claim 11, wherein the bent portion is received within the slot, and wherein the tabs are received within the large portions of the first and second openings.

13. The air cycle machine as recited in claim 10, including at least one O-ring supporting the bearing sleeve within a central opening in the air cycle machine, the O-ring directly engaged with the outer diameter of the bearing sleeve.

14. The air cycle machine as recited in claim 10, including a seal supported by the seal attachment portion.

15. The air cycle machine as recited in claim 10, wherein a portion of the outer diameter is arcuate relative to an outside radius having an origin radially outside of the outer diameter of the bearing sleeve.

16. The air cycle machine as recited in claim 15, wherein the outside radius has an origin approximately 4 inches away from the outside diameter, as measured a distance within a range of a range of 0.190 and 0.210 inches from an axial end of the bearing sleeve.

17. The air cycle machine as recited in claim 10, wherein a ratio of the outer diameter to the inner diameter is within a range of 1.140:1 and 1.142:1.

18. The air cycle machine as recited in claim 10, wherein the large portions of the first and second openings each have axial lengths within a range of 0.265 and 0.305 inches.

19. The air cycle machine as recited in claim 10, wherein the small portions of the first and second openings each have axial lengths within a range of 0.12 and 0.16 inches.

20. The air cycle machine as recited in claim 10, wherein the foil retaining cavity has a length within a range of 2.795 and 2.805 inches.

* * * * *